United States Patent
Datta et al.

(10) Patent No.: US 10,514,961 B1
(45) Date of Patent: Dec. 24, 2019

(54) ENHANCED COOKIE MANAGEMENT FOR FILE WORKFLOWS

(71) Applicant: EMC IP Holding Company LLC, Hopkinton, MA (US)

(72) Inventors: Pankaj Datta, Acton, MA (US); Evgeny Popovich, Vancouver (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 65 days.

(21) Appl. No.: 15/798,746

(22) Filed: Oct. 31, 2017

(51) Int. Cl.
*G06F 9/52* (2006.01)
*G06F 16/958* (2019.01)

(52) U.S. Cl.
CPC .............. *G06F 9/52* (2013.01); *G06F 16/986* (2019.01)

(58) Field of Classification Search
CPC ................................. G06F 9/52; G06F 16/986
USPC ....................................................... 718/1–108
See application file for complete search history.

(56) References Cited

U.S. PATENT DOCUMENTS

| | | | | |
|---|---|---|---|---|
| 8,239,239 B1* | 8/2012 | Malhotra | ........... | G06Q 10/0633 705/7.27 |
| 8,812,660 B2* | 8/2014 | Rowlands | .............. | G06Q 50/06 709/224 |
| 9,026,920 B2* | 5/2015 | Erickson, Jr. | ...... | H04N 21/2225 715/744 |
| 9,276,938 B2* | 3/2016 | Raizada | .................. | H04L 63/10 |
| 9,325,688 B1* | 4/2016 | Hansen | ............... | H04L 67/1097 |
| 9,898,471 B1* | 2/2018 | Liu | ........................ | G06F 3/1275 |
| 2009/0249338 A1* | 10/2009 | Beg | ........................ | G06F 9/4843 718/100 |
| 2011/0055673 A1* | 3/2011 | Teng | ....................... | G06F 21/41 715/200 |
| 2011/0153822 A1* | 6/2011 | Rajan | .................... | G06F 9/5055 709/225 |

OTHER PUBLICATIONS

Crowe, Malcolm, and Sandy Kydd. "Agents and suggestions in a web-based dynamic workflow model." Automation in Construction 10.5 (2001): pp. 639-643. (Year: 2001).*

(Continued)

*Primary Examiner* — Satish Rampuria
(74) *Attorney, Agent, or Firm* — Amin, Turocy & Watson, LLP

(57) ABSTRACT

Data storage facilities that provide data storage services frequently perform management tasks (e.g., workflows) on the data files that are being managed. These workflows have a variety of different characteristics and, as such, the data storage facility has an incentive to set different behaviors for different workflows. For example, many types of workflows performing operations on a file, once started, should be executed to completion before another workflow begins performing operations on the file. Thus, a persistent behavior for these workflows is desired such that the workflow can resume to completion after the workflow ceases executing for some reason (e.g., power loss, crash, restart, etc.). However, there is no guarantee that some workflows (e.g., user-initiated workflows) will resume after ceasing execution. For those workflows, a persistent behavior is not desired. A cookie can be employed to provide enhanced management of file workflows such as setting various behavioral parameters.

20 Claims, 10 Drawing Sheets

(56) References Cited

OTHER PUBLICATIONS

Altintas, Ilkay, et al. "Accelerating the scientific exploration process with scientific workflows." Journal of Physics: Conference Series . vol. 46. No. 1. IOP Publishing, 2006.pp. 468-478 (Year: 2006).*

Castelli, Giuliano, et al. "VO-compliant workflows and science gateways." Astronomy and Computing 11 (2015): pp. 102-108. (Year: 2015).*

* cited by examiner

US 10,514,961 B1

ENHANCED COOKIE MANAGEMENT FOR FILE WORKFLOWS

TECHNICAL FIELD

The present application relates generally to techniques for utilizing cookies for managing file workflows and, more specifically, to providing extended behavior to cookies that manage file workflows.

BACKGROUND

Data centers or other storage facilities can provide various services to customers such as a cloud data storage service. For example, a customer can identify a file to be offloaded to the storage facility and subsequently gain access to that file locally. To provide a data storage service to customers, the storage facility often performs management, maintenance, or other suitable workflows behind the scenes on the file or associated representation in the cloud.

BRIEF DESCRIPTION OF THE DRAWINGS

Numerous aspects, embodiments, objects, and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
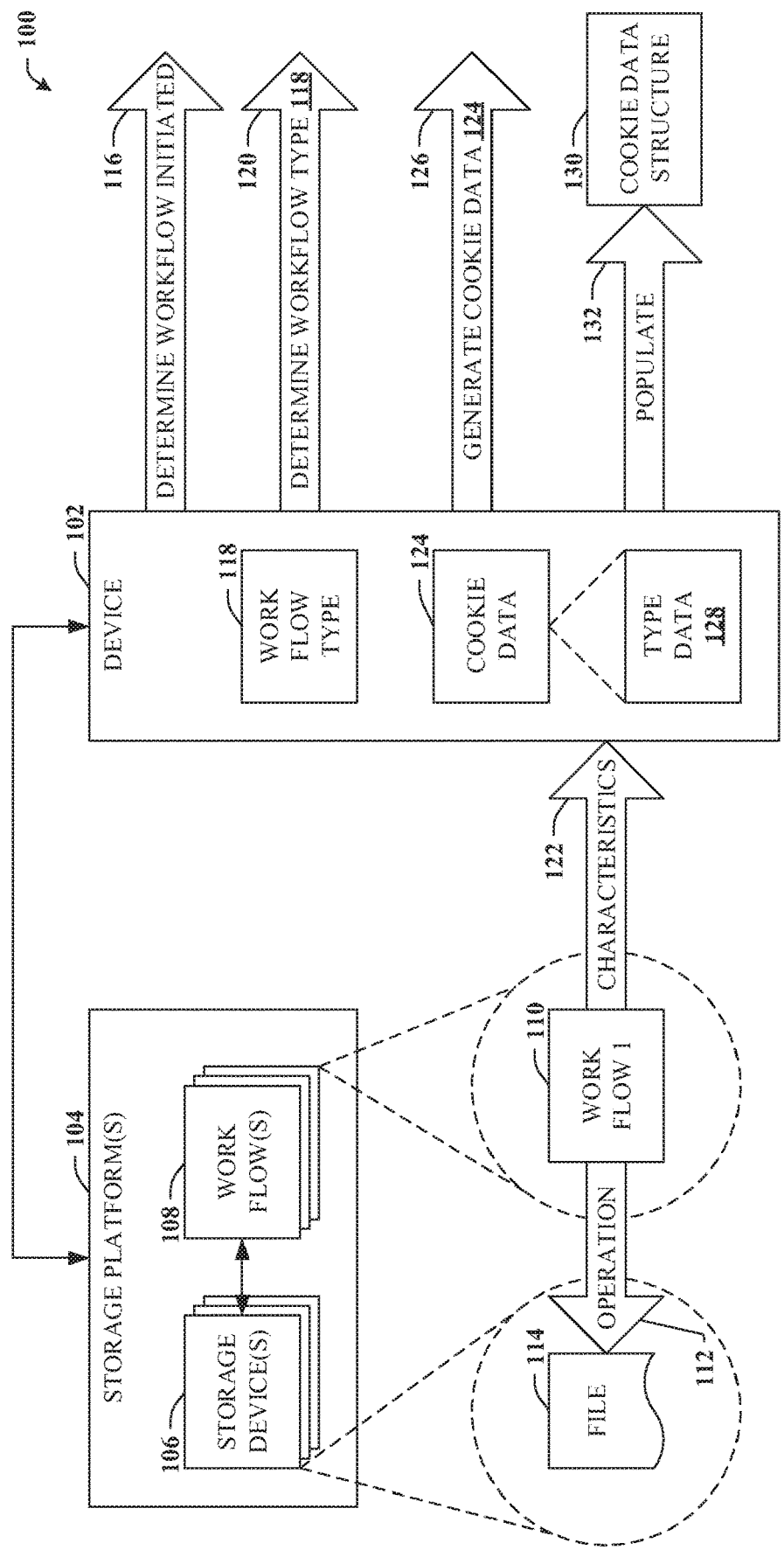
FIG. 1 illustrates a block diagram of an example system that can facilitate enhanced cookie management of file workflows in accordance with certain embodiments of this disclosure.

As used herein, a workflow represents one or more operations on a file. Unlike simple data operations (e.g., read, write) that can be completed virtually instantaneously, the operation(s) of a workflow typically require an appreciable amount of time to complete. As one example, an archive workflow can transform a file by extracting the content from the local file and pushing that content to a cloud storage device. Locally, the file still exists as a shell (e.g., stub file) of the original file that references the content stored at the cloud storage device. However, since the content has been relocated to cloud storage devices, local disk space can be reclaimed and dangers associated with loss of data due to local events can be mitigated.

From the perspective of the storage facility, many challenges exist in connection with managing various workflows. For example, some workflows such as those that transform (e.g., archive, recall, etc.) or replicate (e.g., synchronize) a file are performed mutually exclusively. On the other hand, some workflows (e.g., backup) can have many of the same or similar workflows operating on the file concurrently. Thus, one challenge is the ability to ensure exclusivity for some workflows, while allowing concurrent operation of other workflows, typically of the same type. For example, multiple different backup workflows might be operating on a file concurrently, but the backup workflows might still maintain exclusivity with respect to an archive, recall, or restore workflow.

Another challenge relates to the concept of persistence, or the ability to ensure that a workflow executes to completion before releasing control of a file to operations of other potential workflows. For instance, consider a workflow that is started, but ceases execution before completion of the workflow operations due to a power loss, crash, restart, or other event. In some cases, it can be desirable to maintain a persistence behavior so that, after a restart, the workflow can be completed. File locks have been used to achieve exclusion across workflows, but such locks are lost when the owning process ceases execution. Hence, file locks do not have the persistence behavior.

In contrast, a cookie can be used to provide this persistence behavior, that is, to provide exclusion on a persistent basis. However, it is understood that if persistence is desired then a second workflow may not be able to operate on the file until the first workflow executes to completion. While some workflows (e.g., system-initiated workflows) typically will resume after restart, there is no guarantee that other workflows (e.g., user-initiated workflows) will be resumed after the restart. Such can be problematic because persistence can prevent other workflow from operating on a file until the first workflow is completed, and the first workflow may not ever complete due to a crash or other event and no subsequent instruction to resume the workflow. Hence, while persistence can be a desirable behavior in many cases, it can also be desirable to selectively avoid the persistence behavior in other cases. Other cookie mechanisms that provide persistence do not have the ability to selectively provide the persistence behavior, such as for scenarios in which such is not desired.

The subject matter disclosed herein, in some embodiments, is directed to a cookie data structure having extended mechanisms for creation, ownership, persistence, and usage of the associated cookie data that is adapted to cloud file workflows. For example, subject matter presented herein can offer a solution to various challenges associated with file workflow management. For instance, the disclosed cookie data structure can provide the ability to selectively set various behavioral parameters that can define interactions between workflow and the file upon which the workflow operates as well as interactions between the workflow and other workflows. Such parameters can relate to exclusivity vs. shared access concepts, to persistence vs. disposable concepts, or other suitable concepts. In some embodiments, the disclosed cookie data structure can allow for selectively determining and/or setting the cookie to operate with the desired behavior, which can be materially distinct from other solutions. For example, file locks do not have the persistence behavior or the ability to selective determine or set a persistence-type parameter. Likewise, other cookie data structures do not have the disposable behavior (e.g., non-persistent behavior) or the ability to selectively determine or set a persistence-type parameter.

Example Systems

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawings, with initial reference to FIG. 1, an example system 100 is depicted. System 100 can facilitate enhanced cookie management of file workflows. For example, system 100 can comprise device 102 that can generate cookie data having configurable behavior parameters that define workflow interactions. Generally, device 102 can comprise a processor and a memory that stores executable instructions that, when executed by the processor, facilitate performance of operations. Examples of the memory and processor can be found with reference to FIG. 10. It is to be appreciated that the computer 1002 can represent a server device or a client device and can be used in connection with implementing one or more of the systems, devices, or components shown and described in connection with FIG. 1 and other figures disclosed herein.

Device 102 can be operatively or communicatively coupled to one or more storage platforms 104. In some embodiments, device 102 can be included in one or more storage platforms 104. In some embodiments, storage platforms 104 can represent a data storage facility such as a cloud-based storage platform that provides data storage services to customers. In some embodiments, storage platforms 104 can be inclusive of customer equipment. Hence, storage devices 106 can include drives or other storage elements of the storage facility as well as customer or client devices.

For example, consider a storage facility that offers services (e.g., cloud-based services) with respect to a customer. The customer can designate a file 114 for which the services are desired. To provide these services, the storage facility can implement one or more workflows 108. As illustrated, device 102 can determine that a first workflow 110 has been initiated, which is indicated by reference numeral 116. First workflow 110 can be configured to perform a first operation 112 on file 114. Unlike simple data operations (e.g., read, write) that can be completed virtually instantaneously, the operation(s) 112 of first workflow 110 typically require an appreciable amount of time to complete. Thus, it is not uncommon that processes that are executed in connection with the first workflow 110 are terminated or otherwise cease to be executed before the first workflow 110 completes the designated task. For example, certain processes may crash during execution or be affected by a power outage, a device reboot, or another event such as, e.g., voluntarily relinquishing control of the device due to resources required to complete a workflow step. Thus, it is appreciated that in some embodiments, operation 112 of first workflow 110 can be confronted with challenges that do not arise in connection other file-based operations that typically execute to completion virtually instantly.

Device 102 can further determine workflow type 118, which is illustrated by reference numeral 120. Workflow type data 118 can be representative of a type of first workflow 110, and can be determined based on characteristics 122 of first workflow 110. Examples of the type of first workflow 110 can include an archive workflow, a recall workflow, a synch workflow, a backup workflow, and so on. It is understood that workflow type data 118 can be determined as a result of a programming decision (e.g., predetermined at the time of programming the workflow) or determined on the fly (e.g., dynamically determined at the time of execution of the workflow).

Figure 2:
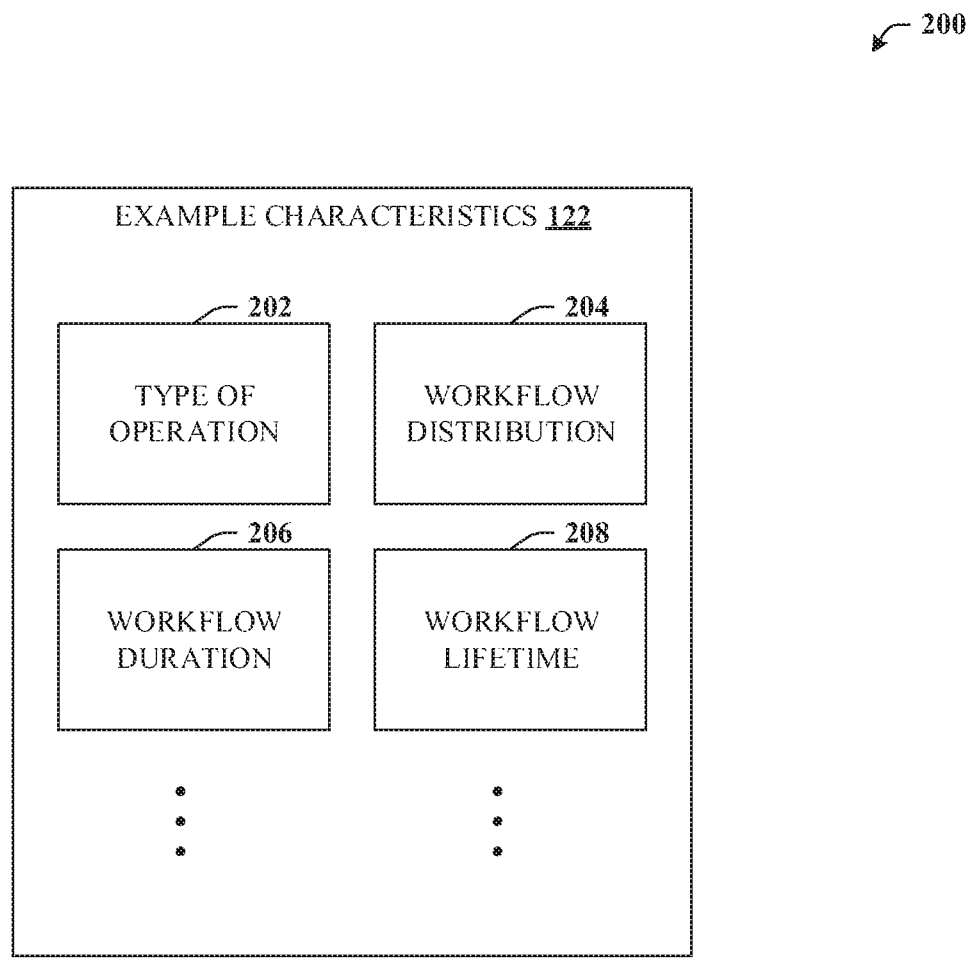
FIG. 2 depicts a block diagram illustrating example characteristics that can be utilized by which to determine the workflow type and/or workflow type data in accordance with certain embodiments of this disclosure.

While still referring to FIG. 1, but turning now as well to FIG. 2, block diagram 200 is depicted. Diagram 200 illustrates example characteristics 122 that can be utilized by which to determine the workflow type and/or workflow type data 118. A type of operation(s) 202 that are utilized by a given workflow can be one example of characteristics 122, and indicative of the type of workflow. Workflow distribution 204 can be another example of characteristics 122, and indicative of how the workflow is distributed. Workflow duration 206 and workflow lifetime 208 represent still other examples of characteristics 122, which can be representative of various temporal aspects of the associated workflow.

Continuing the discussion of FIG. 1, device 102 can generate cookie data 124, which is illustrated by reference numeral 126. Cookie data 124 can be generated based on workflow type data 118. Cookie data 124 can be representative of a cookie that indicates first workflow 110 has been assigned to perform first operation 112 on file 114. Cookie data 124 can comprise type data 128 that, based on a type of the cookie, defines interactions between file 114 and workflows 108. In other words, type data 128 can define interactions between file 114 and workflow 110 as well as other workflows, if any, that attempt to perform operations on file 114. Hence, the behavior of the cookie associated with cookie data 124 can be set to function in a specific manner and such can be set based on the workflow type data 118.

As illustrated by reference numeral 132, device 102 can populate cookie data structure 130 with cookie data 124. In some embodiments, cookie data structure 120 can reside in file 114. For example, cookie data structure 130 can be in a header portion or a metadata portion of file 114. In some embodiments, file 114 can be a stub file that references content located on a remote or cloud-based storage device.

Additional detail with respect to cookie data 124 and example behaviors are provided in connection with FIGS. 3A-6, which can be referenced along with FIG. 1 for better clarity.

Figure 3A:
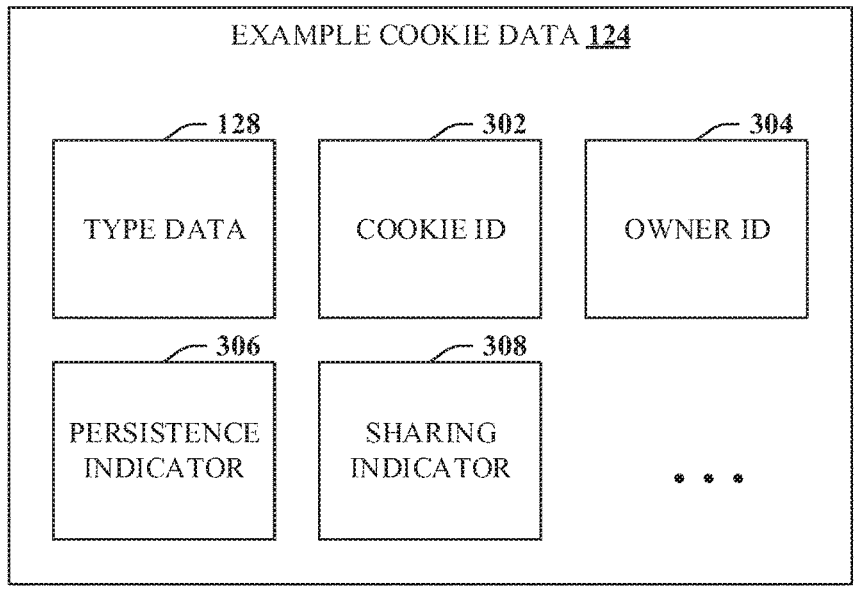
FIG. 3A depicts a block diagram illustrating various examples of cookie data in accordance with certain embodiments of this disclosure.

With reference now to FIG. 3A, block diagram 300A is depicted. Diagram 300A illustrates various examples of cookie data 124. As noted previously, cookie data 128 can include type data 128 that can define interactions between the file and a group (e.g., workflows 108) of workflows. Cookie data 124 can further include cookie ID data 302 that can identify the associated cookie. Cookie ID data 302 can be generated differently based on the type of cookie, as further described in connection with FIG. 5.

Cookie data 124 can also include owner ID data 304 that can identify an owner of the cookie. For example, in the present example, first workflow 110 has been initiated (e.g., is performing operations 112 on file 114), so first workflow 110 may be identified by owner ID data 304 as the owner of the cookie. In some embodiments, the owner of the cookie can indicate control over file 114 such as the ability or behavior to prevent (or allow) other workflows performing operations on file 114 while ownership is maintained.

Cookie data 124 can further include persistence indicator 306. In some embodiments, persistence indicator 306 can represent an indication of whether ownership of a cookie persists until the owning workflow executes to completion. For example, if persistence indicator 306 indicates ownership of the cookie is to persist, then the owning workflow can maintain control of the cookie even if processes of the owning workflow cease execution temporarily (e.g., in response to a crash, restart, pause, etc.). On the other hand, if persistence indicator 306 indicates ownership of the cookie is not to persist, then the owning workflow need not be maintained if associated processes cease execution. Rather, the next workflow to attempt to perform operations on file 114, whether a different or the same workflow, can become the owner of the cookie.

Cookie data 124 can further include sharing indicator 308. Sharing indicator 308 can indicate whether a second workflow (e.g., of workflows 108) that is configured to perform a second operation on file 114 is permitted to be initiated while first workflow 110 has ownership of the cookie. As will become more apparent with reference to FIG. 3B, in some embodiments, persistence indicator 306 and/or sharing indicator 308 can be reflected based on type data 128. However, in some embodiments, at least a portion of persistence indicator 306 can be separate from, and/or set or updated independently of, type data 128. For example, whether certain conditions are satisfied with respect to persistence can set independently of type data 128, as discussed in connection with FIG. 4.

Figure 3B:
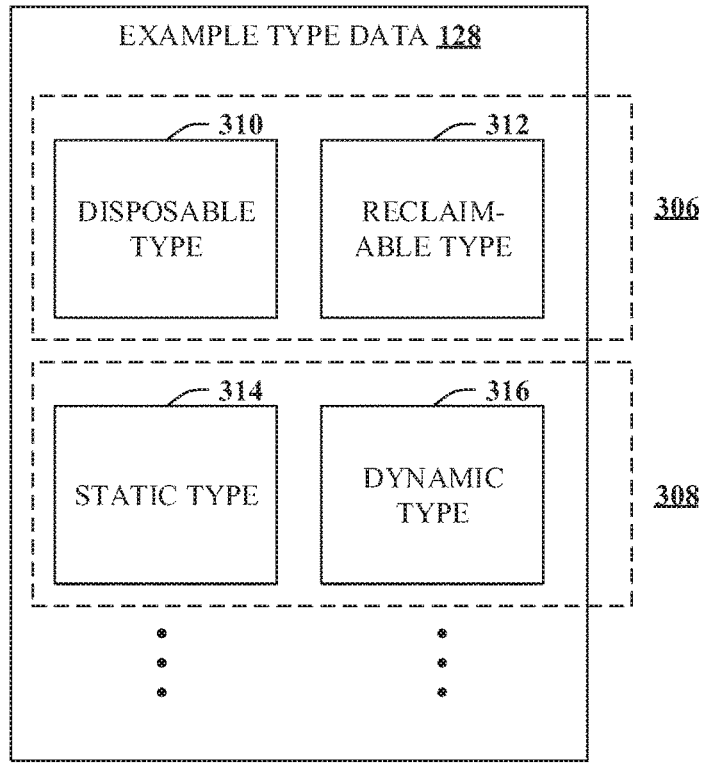
FIG. 3B depicts a block diagram illustrating various examples of type data for a cookie in accordance with certain embodiments of this disclosure.

Referring now to FIG. 3B, block diagram 300B is depicted. Diagram 300B illustrates various examples of type data 128. As discussed, type data 128 can define interactions between file 114 and workflows 108 based on a type of the cookie. In some embodiments, device 102 can set type data 128 to disposable type 310. Disposable type 310 can indicate that first workflow 110 has ownership of the cookie until first workflow 110 ceases executing. It is noted, such can be independent of whether first workflow 110 has resulted in a completion of the operation 112.

As another example, in some embodiments, device 102 can set type data 128 to reclaimable type 312. Reclaimable type 312 can indicate that first workflow 110 has ownership of the cookie until first workflow 110 results in completion of operation 112. It is noted, such can be independent of whether first workflow 110 ceases executing (e.g., crashes, restarts, etc.) prior to the completion of the operation 112. As illustrated, setting type data 128 to either disposable type 310 or reclaimable type 312 can be indicative of some portion of persistence indicator 306.

In some embodiments, device 102 can set type data 128 to static type 314. Static type 314 can indicate that a second workflow (e.g., different than first workflow 110), of the group of workflows 108, configured to perform a second operation on the file, is permitted to execute while first workflow 110 has ownership of the cookie. In some embodiments, the second workflow has the same or a similar workflow type 118 as that for first workflow 110. In some embodiments, device 102 can update cookie data 124 and/or specifically owner ID data 304 to indicate that first workflow 110 and the second workflow have co-ownership of the cookie.

In some embodiments, cookies of static type 314 can include a static cookie ID 302 that does not necessarily change when ownership changes and that is known by the second workflow such that the second workflow does not attempt to create a new cookie with a different cookie ID 302. Otherwise, if the second workflow generated a new cookie with a different cookie ID 302, the second workflow might be informed that a different cookie with a different owner is already associated with file 114 and hence, the second workflow must wait before performing operations on file 114, undermining the potential for sharing. To avoid such, the second workflow can leverage the same (static) cookie ID 302 that was assigned when first workflow 110 was initiated.

In some embodiments, device 102 can set type data 128 to dynamic type 316. Dynamic type 316 can indicate that the second workflow, of the group of workflows 108, configured to perform a second operation on the file, is not permitted to execute while first workflow 110 has ownership of the cookie. In some embodiments, cookies of dynamic type 316 can include a dynamic cookie ID 302 that changes when ownership changes. Hence, when the second workflow attempts to create a new cookie with a different cookie ID 302, such is not permitted, since the first cookie is already set for file 114. As illustrated, setting type data 128 to either static type 314 or dynamic type 316 can be indicative of some portion of sharing indicator 308.

Figure 4:
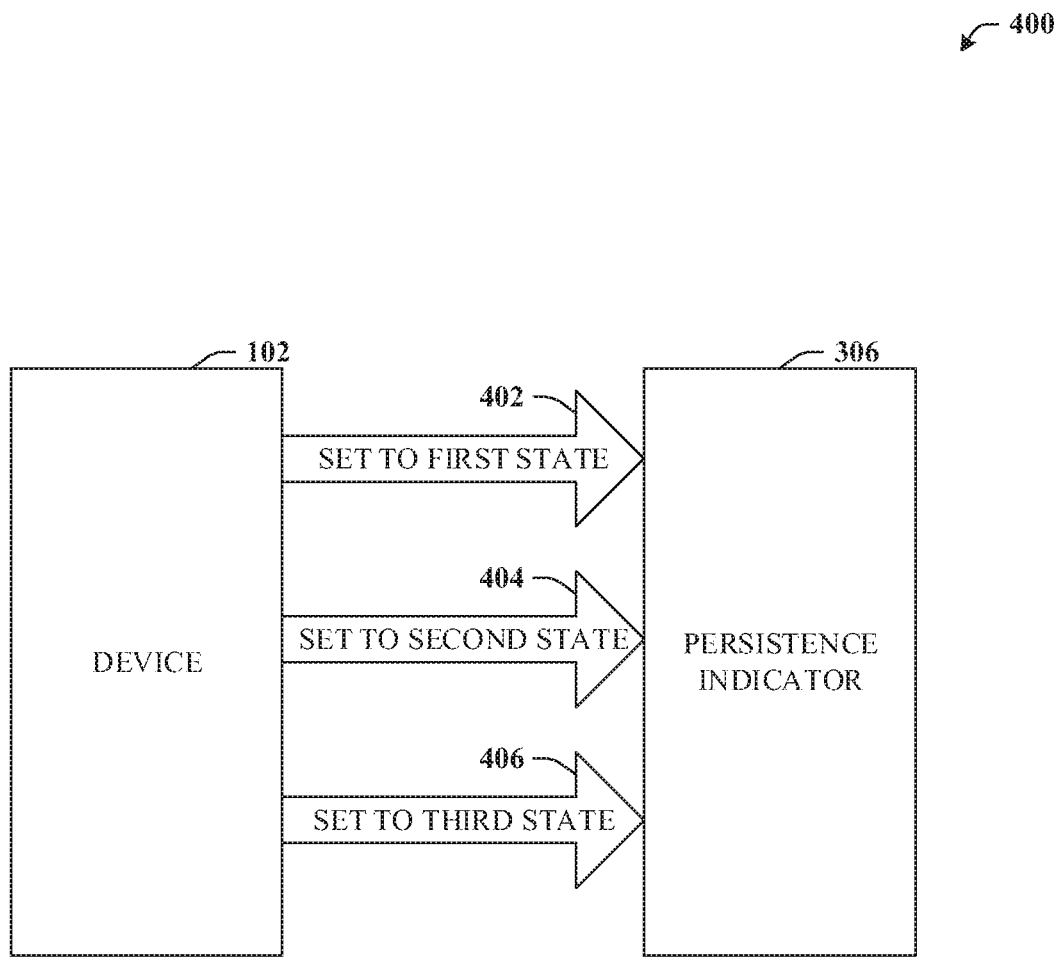
FIG. 4 illustrates a block diagram of an example system that can provide for additional aspects or elements in connection with setting the persistence indicator in accordance with certain embodiments of this disclosure.

Turning now to FIG. 4, system 400 is depicted. System 400 can provide for additional aspects or elements in connection with setting the persistence indicator 306. For example, in some embodiments, persistence indicator 306 can indicate whether a condition by which first workflow 110 maintains ownership of the cookie is satisfied. Ownership of the cookie can be with respect to a second workflow, of workflows 108, that is configured to perform a second operation on file 114.

In some embodiments, device 102 can set persistence indicator 306 to a first state 402. First state 402 can indicate that first workflow 110 has ownership of the cookie in response to determining that the condition is satisfied. It is appreciated that the condition can differ based on type data 128. For instance, if the cookie is of disposable type 310, then the condition can be that first workflow 110 is currently executing operation 112 and/or has not ceased performing operation 112. If the cookie is of reclaimable type 312, then the condition can be that first workflow 110 is currently executing operation 112 and/or has not completed performing operation 112. In some embodiments, first state 402 can be set during creation of the cookie by designating the cookie to be of disposable type 310 or reclaimable type 312.

In some embodiments, device 102 can set persistence indicator 306 to second state 404. Second state 404 can indicate that first workflow 110 no longer has ownership of the cookie in response to determining that the condition is not satisfied. Second state 404 can further indicate that second workflow has ownership of the cookie. For example, second state 404 might be set when the cookie is of static type 314 that allows for concurrent workflows to be executing with respect to file 114. Thus, suppose first workflow 110 has ownership, while the second workflow is concurrently executing. Further suppose first workflow 110 crashes (e.g., for a disposable, static type cookie) or completes execution (e.g., for a reclaimable, static type cookie), but the second workflow continues executing. Cookie data 124 having a type 128 of disposable, static or reclaimable, static may be updated to reflect that the second workflow is now the owner of the cookie.

In some embodiments, device 102 can set persistence indicator 306 to third state 406. Third state 406 can indicate the cookie is not owned in response to determining that the condition is not satisfied. Generally, a cookie set to third state 406 can be cleared such that a new cookie can be generated with respect to a third workflow being initiated to perform operations on file 114. In some embodiments, such can be done lazily or on an as-needed basis. For example, at the time when the third workflow is initiated.

Figure 5:
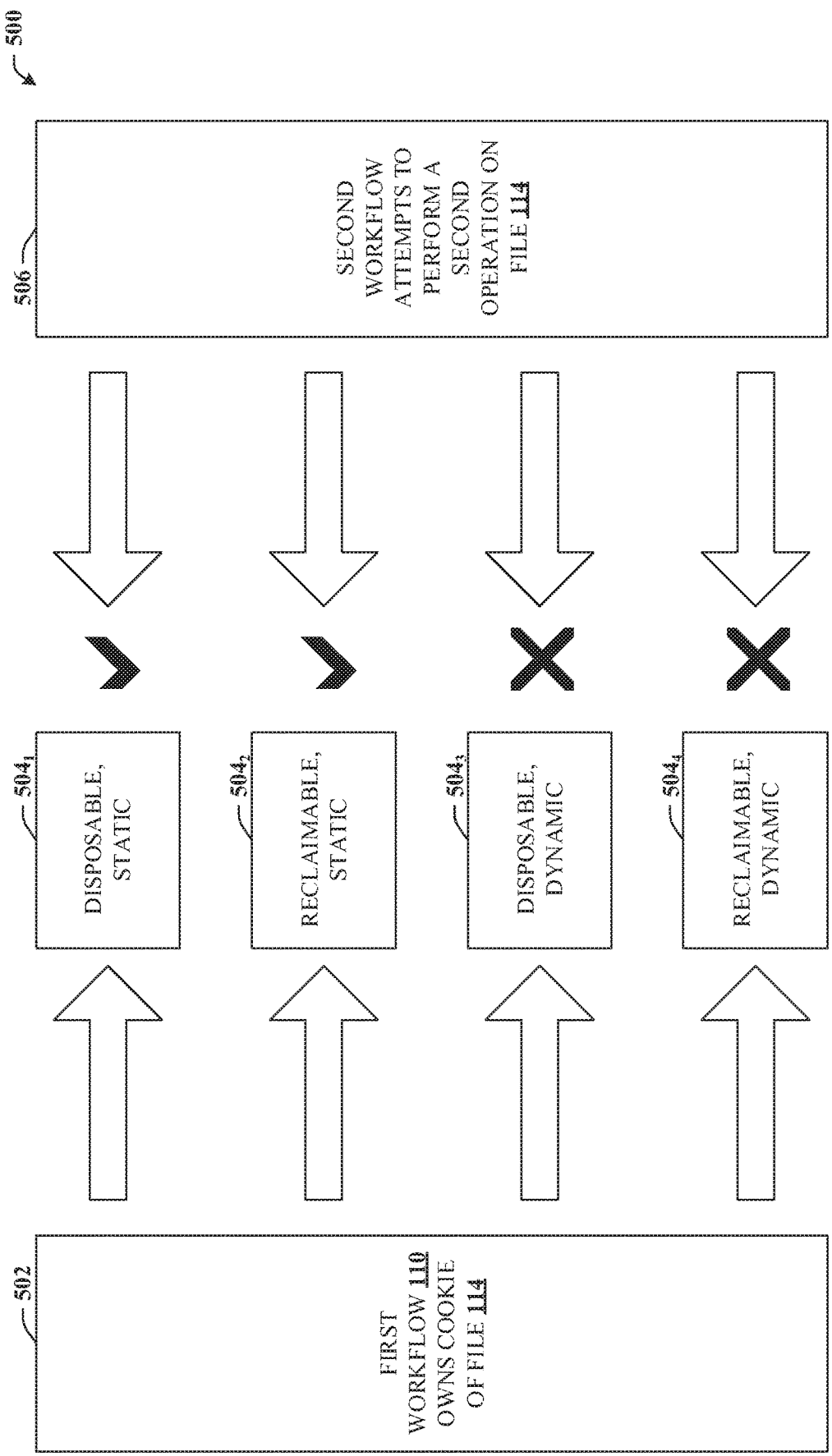
FIG. 5 illustrates a block diagram illustrating a first example of various potential interactions with a second workflow determined by a type of cookie in accordance with certain embodiments of this disclosure.

Referring now to FIG. 5, block diagram 500 is depicted. Diagram 500 illustrates a first example of various potential interactions with a second workflow determined by a type of cookie. For example, consider again the scenario in which first workflow 110 is performing operation(s) 112 on file 114. Further consider that first workflow 110 owns the associated cookie, as illustrated by reference numeral 502, and/or has control over file 114. As depicted by reference numeral 506, a second workflow attempts to perform second operation(s) on file 114.

Whether the second workflow can operate on file 114 can depend on type data 128. For instance, cookies having a static type 314 can allow concurrent workflows to operate on file 114. In this example, four different cookie types are illustrated by example. The first example cookie type is a disposable, static cookie $504_1$. The second example cookie type is a reclaimable, static cookie $504_2$. The third example cookie type is a disposable, dynamic cookie $504_3$. The fourth example cookie type is a reclaimable, dynamic cookie $504_4$.

Diagram 500 illustrates that setting parameters of a cookie can provide exclusivity behavior by setting to dynamic types (e.g., types $504_3$ and $504_4$) or non-exclusivity behavior by setting to static types (e.g., types $504_1$ and $504_2$). In other words, the second workflow might be allowed to perform second operations on file 114 concurrently with first workflow 110 if the cookie owned by first workflow 110 is of static type. Otherwise, the attempt by second workflow can be denied.

Figure 6:
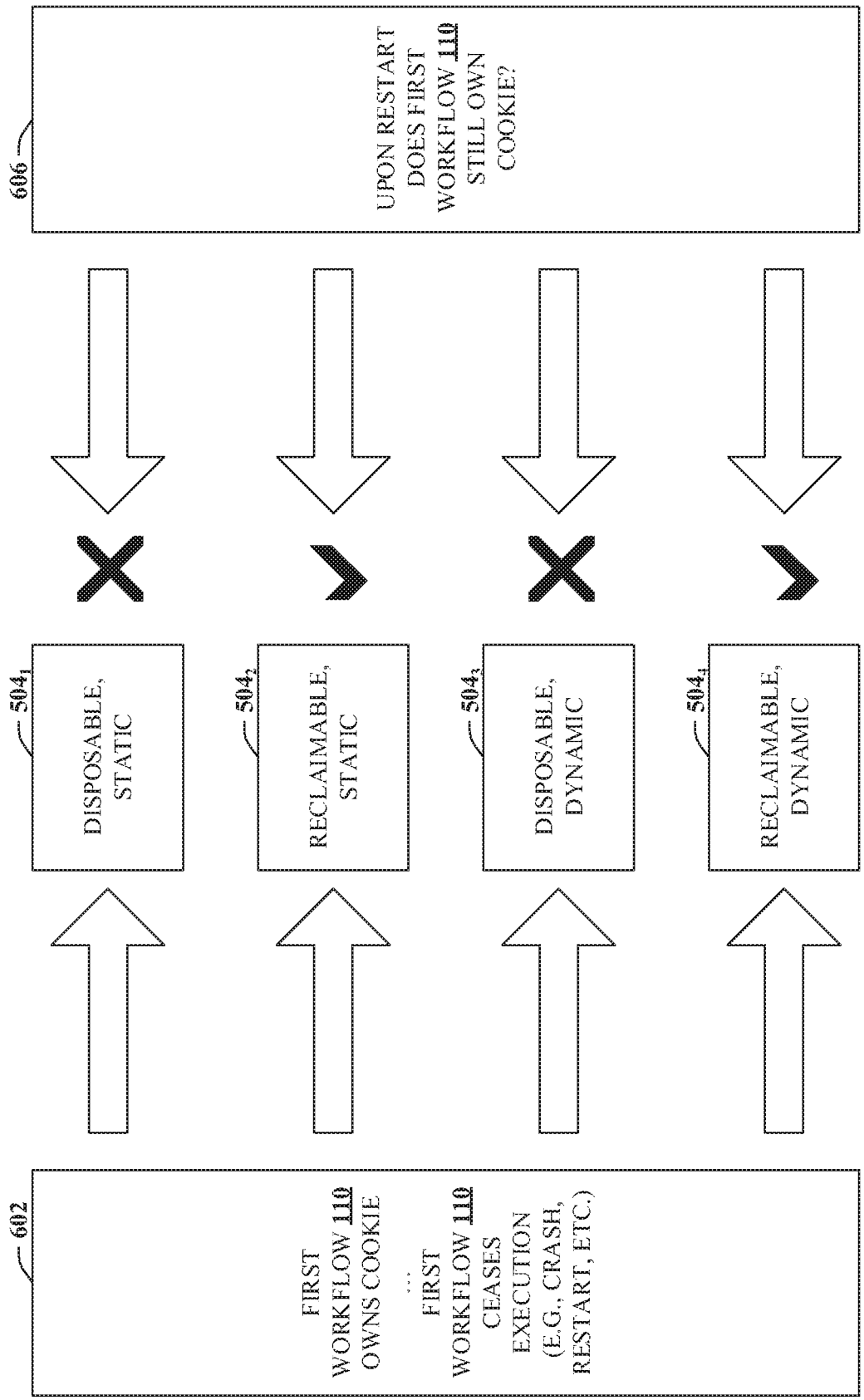
FIG. 6 illustrates a block diagram illustrating a second example of various potential interactions with a second workflow determined by a type of cookie in accordance with certain embodiments of this disclosure.

Turning now to FIG. 6, block diagram 600 is depicted. Diagram 600 illustrates a second example of various potential interactions with a second workflow determined by a type of cookie. As with the previous example, first workflow 110 again owns the cookie, as depicted by reference numeral 602. In this example, however, while first workflow 110 is performing operation(s) 112 on file 114, first workflow ceases execution (e.g., crashes, is restarted, etc.) some time prior to completion. Another element to consider is whether, upon restart, first workflow 110 still owns the cookie, which is illustrated by reference numeral 606. Hence, diagram 600 illustrates that setting parameters of a cookie can provide persistence behavior by setting to reclaimable types (e.g., types $504_2$ and $504_4$) or non-persistence behavior by setting to disposable types (e.g., types $504_1$ and $504_3$).

Example Methods

Figure 7:
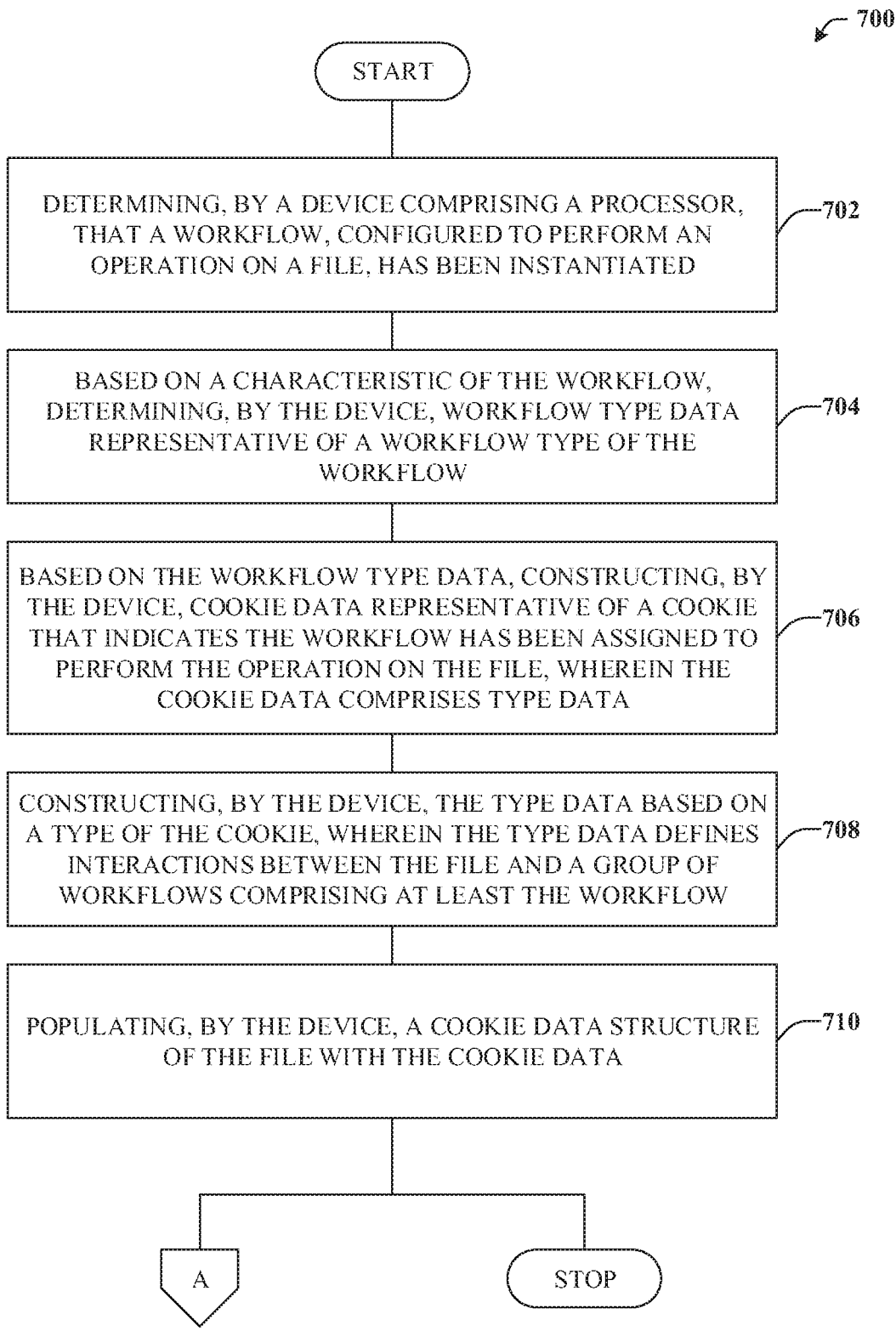
FIG. 7 illustrates an example methodology that can facilitate enhanced cookie management of file workflows in accordance with certain embodiments of this disclosure.
Figure 8:
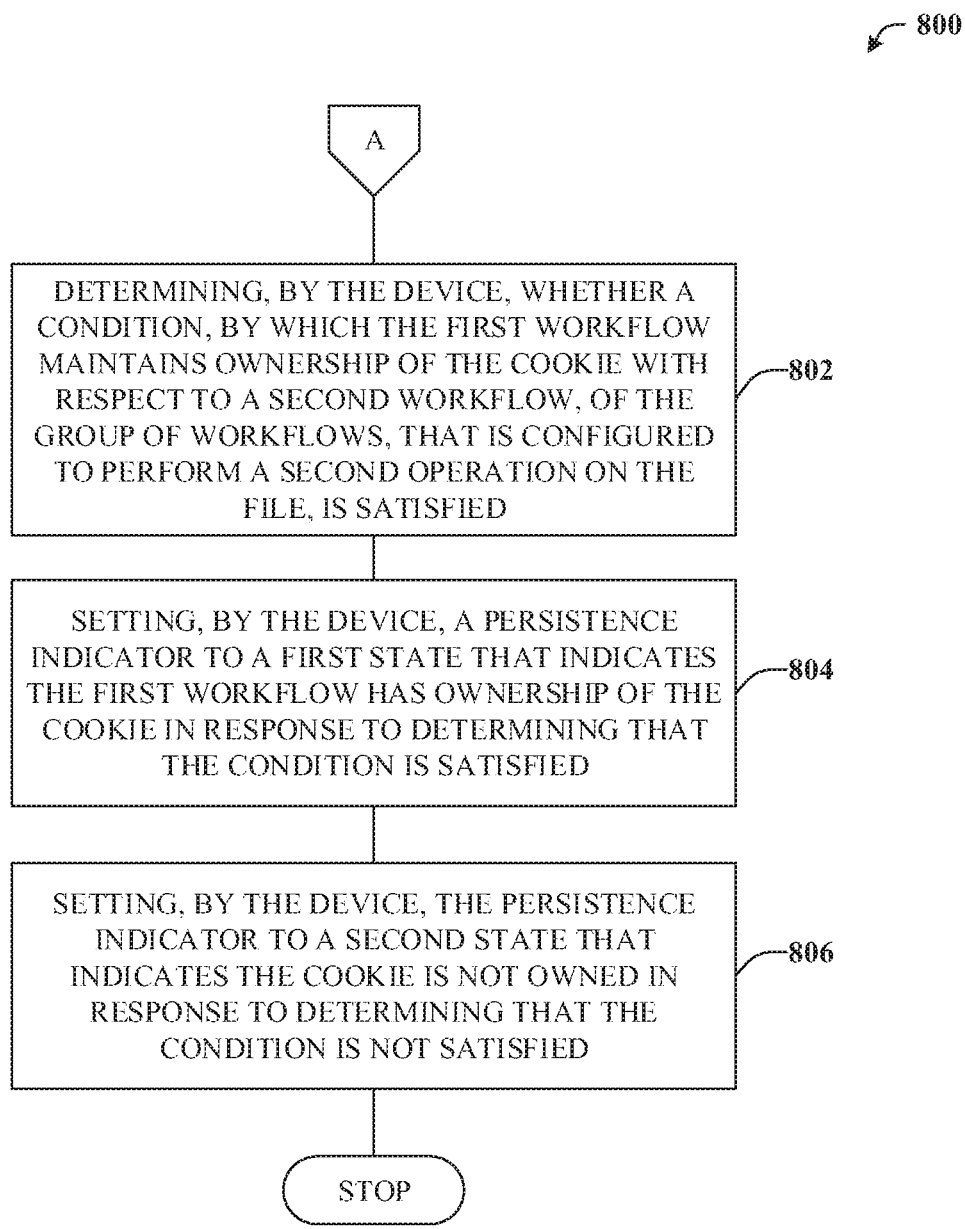
FIG. 8 illustrates an example methodology that can provide for additional elements or aspects in connection with can facilitating enhanced cookie management of file workflows in accordance with certain embodiments of this disclosure.

FIGS. 7 and 8 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 7, exemplary method 700 is depicted. Method 700 can facilitate enhanced cookie management of file workflows. For example, at reference numeral 702, a device comprising a processor can determine that a first workflow has been instantiated. The first workflow can be configured to perform an operation on a file At reference numeral 704, the device can determine workflow type data. The workflow type data can be representative of a workflow type of the workflow that was determined at reference numeral 702 to have been instantiated. The workflow type data can be determined based on characteristics of the workflow. Such characteristics can be, e.g., the types of operations the workflow performs on the file, how the workflow is distributed, workflow lifetime, workflow duration and so forth.

At reference numeral 706, the device can construct cookie data based on the workflow type data determined at reference numeral 704. The cookie data can be representative of cookie that indicates the workflow has been assigned to perform the operations on the file. The cookie data can include, inter alia, type data, which is further detailed in connection with reference numeral 708.

At reference numeral 708, the device can construct the type data based on a type of the cookie that is desired or otherwise indicated. The type data can define interactions between the file and the workflow and/or other workflows. For example, the type data can define whether the workflow has exclusivity with respect to other workflows that attempt to perform operations on the file. If the workflow does have exclusivity, then other workflows cannot perform operations on the file while the workflow has ownership of the cookie. If the workflow does not have exclusivity, then other workflows might be allowed to perform operations on the file (and potentially share ownership) while the workflow has ownership. As another example, the type data can define whether the workflow has persistent ownership of the cookie until the workflow completes. A workflow that persistent ownership can retain ownership until the workflow completes, even when the workflow ceases execution due to some event prior to completion. A workflow that does not have persistent ownership can lose ownership if the workflow ceases execution prior to completion due to some event (e.g. reboot, crash, etc.). Such can be the case, even if the workflow does not complete.

At reference numeral 710, the device can populate a cookie data structure with the cookie data. The cookie data structure can be extant in the file, such as in a header portion or a metadata portion of the file. Method 700 can proceed to insert A, which is further detailed in connection with FIG. 8, or stop.

With reference now to FIG. 8, exemplary method 800 is illustrated. Method 800 can provide for additional elements or aspects in connection with can facilitating enhanced cookie management of file workflows. For example, at reference numeral 802, the device can determine whether a condition by which the workflow maintains ownership of the cookie is satisfied. Ownership of the cookie can be with respect to a second workflow that is configured to perform a second operation on the file. The condition can differ based on a type associated with the cookie. By way of example, for cookies having the disposable type, the condition can relate to whether the workflow has or has not stopped executing operations on the file. For cookies having the reclaimable type, the condition can relate to whether the workflow has or has not completed.

At reference numeral 804, the device can set a persistence indicator to a first state that indicates the workflow has ownership of the cookie, which can be performed in response to determining that the condition is satisfied (e.g. that the workflow has not stopped executing operation, that the workflow has not completed, etc.). At reference numeral 806, the device can set the persistence indicator to a second state that indicates the cookie is not owned in response to determining that the condition is not satisfied. For example, if the workflow ceases execution (e.g., for disposable cookie types) or completes (e.g., for reclaimable cookie types), then the condition is no longer satisfied and the associated workflow can cede ownership of the cookie. A different workflow that is subsequently instantiated can generate a new cookie and acquire ownership of the new cookie.

Example Operating Environments

Figure 9:
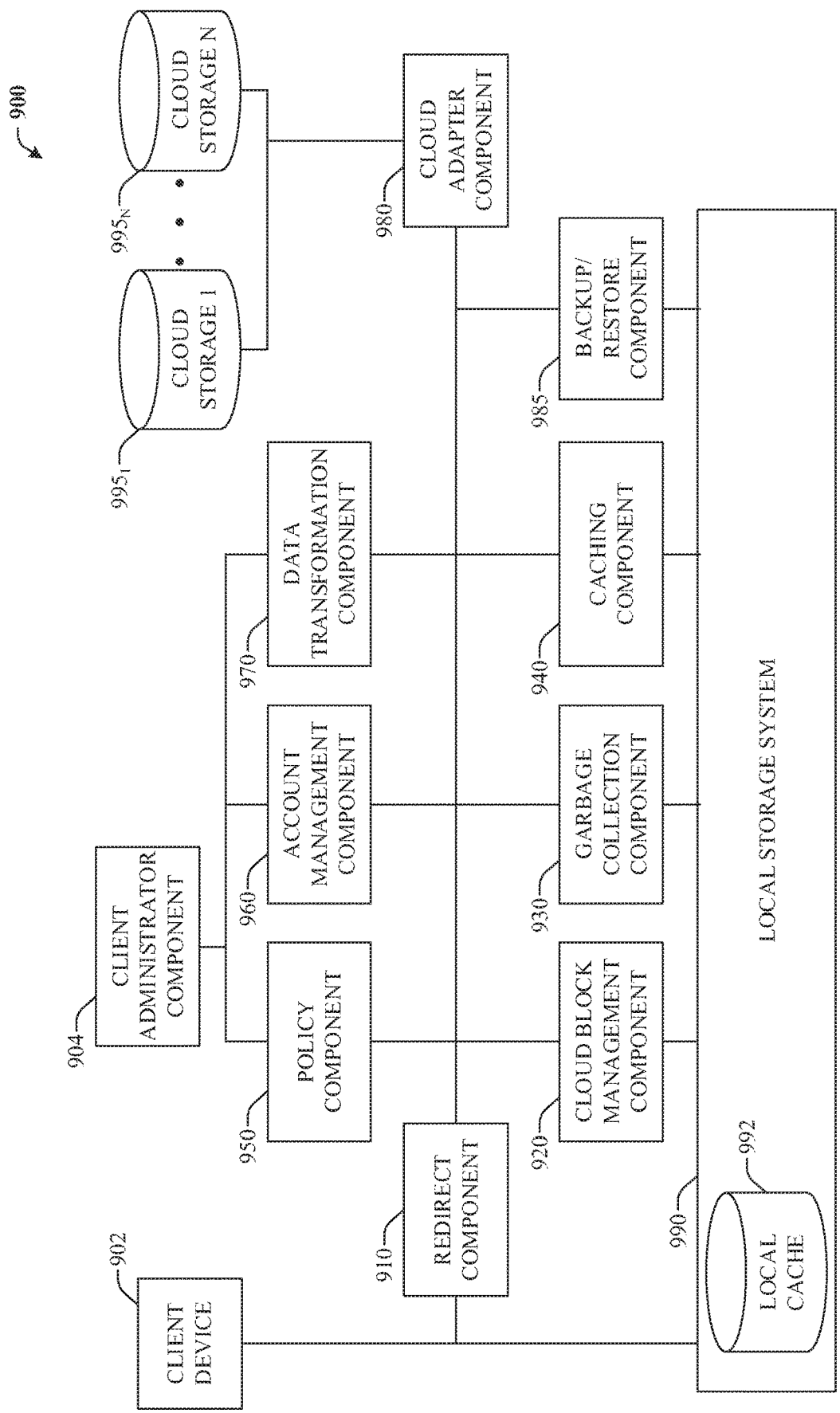
FIG. 9 illustrates a block diagram of an example distributed file storage system that employs tiered cloud storage in accordance with certain embodiments of this disclosure.
Figure 10:
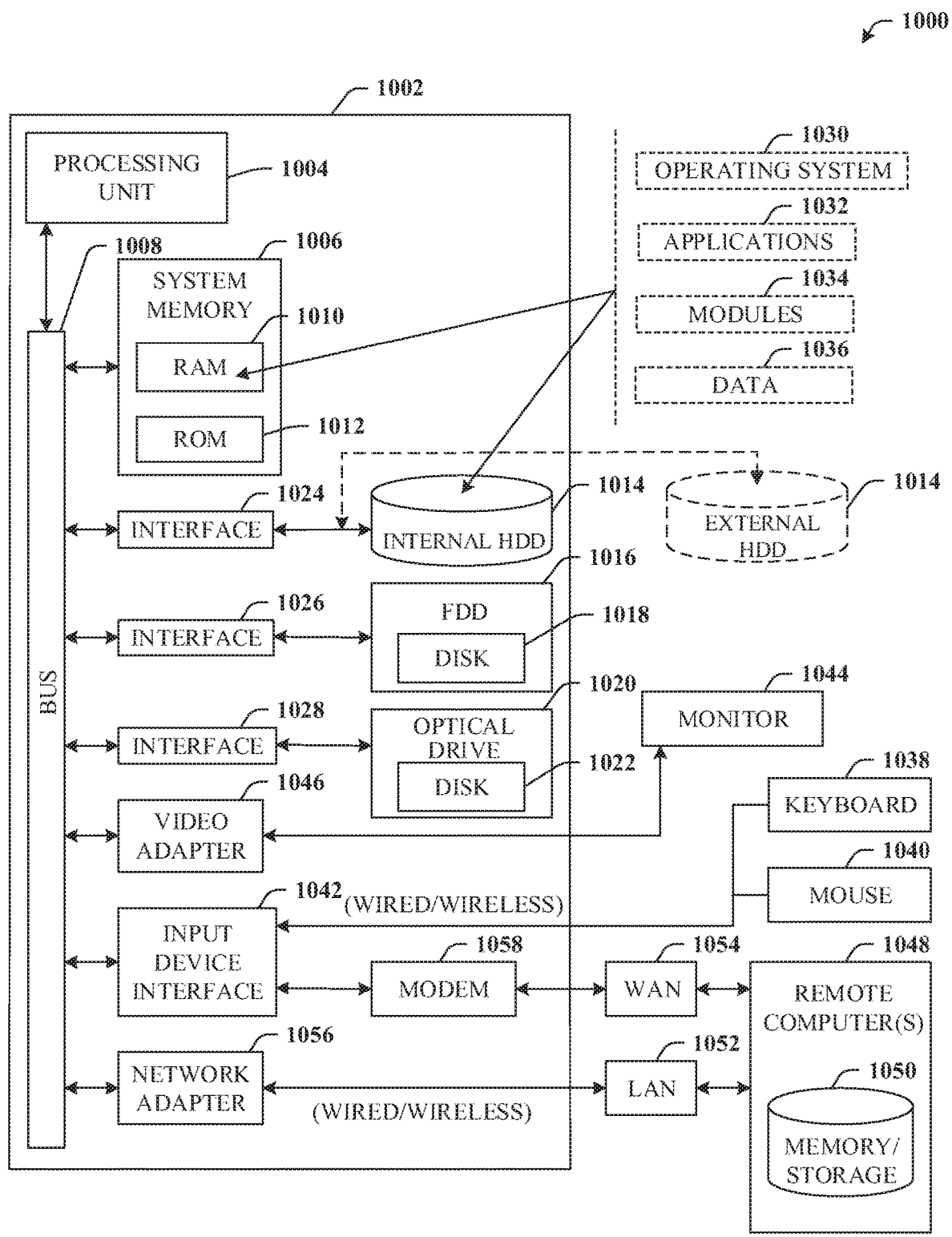
FIG. 10 illustrates an example block diagram of a computer operable to execute certain embodiments of this disclosure.

To provide further context for various aspects of the subject specification, FIGS. 9 and 10 illustrate, respectively, a block diagram of an example distributed file storage system 900 that employs tiered cloud storage and block diagram of a computer 1002 operable to execute the disclosed storage architecture in accordance with aspects described herein.

Referring now to FIG. 9, there is illustrated an example local storage system including cloud tiering components and a cloud storage location in accordance with implementations of this disclosure. Client device 902 can access local storage system 990. Local storage system 990 can be a node and cluster storage system such as an EMC Isilon Cluster that operates under OneFS operating system. Local storage system 990 can also store the local cache 992 for access by other components. It can be appreciated that the systems and methods described herein can run in tandem with other local storage systems as well.

As more fully described below with respect to redirect component 910, redirect component 910 can intercept operations directed to stub files. Cloud block management component 920, garbage collection component 930, and caching component 940 may also be in communication with local storage system 990 directly as depicted in FIG. 9 or through redirect component 910. A client administrator component 904 may use an interface to access the policy component 950 and the account management component 960 for operations as more fully described below with respect to these components. Data transformation component 970 can operate to provide encryption and compression to files tiered to cloud storage. Cloud adapter component 980 can be in communication with cloud storage 1 and cloud storage N, where N is a positive integer. It can be appreciated that multiple cloud storage locations can be used for storage including multiple accounts within a single cloud storage location as more fully described in implementations of this disclosure. Further, a backup/restore component 997 can be utilized to back up the files stored within the local storage system 990.

Cloud block management component 920 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete Mode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 920 in chunks of data. A uniform chunk size can be selected where all files that tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 960 manages the information for cloud storage accounts. Account information can be populated manually via a user interface provided to a user or administer of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 920 based on list of mappings it manages. For example, each stub can be associated with an account, and the cloud block management component 920 can aggregate information from a set of stubs associated with the same account. Other example statistics that can be maintained include the number of recalls, the number of writes, the number of modifications, the largest recall by read and write operations, etc. In one implementation, multiple accounts can exist for a single cloud service provider, each with unique account names and access codes.

The cloud adapter component 980 manages the sending and receiving of data to and from the cloud service providers. The cloud adapter component 980 can utilize a set of APIs. For example, each cloud service provider may have provider specific API to interact with the provider.

A policy component 950 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 930. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 930 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 940 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 920, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 940 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 940 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that it has been placed in a queue, and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be requeued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tacking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 970 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 997 can transfer a copy of the files within the local storage system 990 to another cluster (e.g., target cluster). Further, the backup/restore component 997 can manage synchronization between the local storage system 990 and the other cluster, such that, the other cluster is timely updated with new and/or modified content within the local storage system 990.

Referring now to FIG. 10, there is illustrated a block diagram of a computer 1002 operable to execute the disclosed communication architecture. To provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 10, the example environment 1000 for implementing various aspects of the specification includes a computer 1002, the computer 1002 including a processing unit 1004, a system memory 1006 and a system bus 1008. As an example, the component(s), server(s), node(s), cluster(s), system(s), and/or device(s) disclosed herein can each include at least a portion of the computer 1002. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random-access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014, which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

Many program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and/or a pointing device, such as a mouse 1040 or a touch screen or touchpad (not illustrated). These and other input devices are often connected to the processing unit 1004 through an input device interface 1042 that is coupled to the system bus 1008, but can be connected by other interfaces, such as a parallel port, an IEEE 1394 serial port, a game port, a USB port, an infrared (IR) interface, etc. A monitor 1044 or other type of display device is also connected to the system bus 1008 via an interface, such as a video adapter 1046.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., desktop and/or portable computer, server, communications satellite, etc. This includes at least Wi-Fi and Bluetooth® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 1002.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:
a first processor; and
a memory that stores executable instructions that, when executed by the processor, facilitate performance of operations, comprising:
  determining that a first workflow, executed by a second processor and configured to perform a first operation on a file, has been initiated;
  based on a characteristic of the first workflow, determining workflow type data representative of a workflow type of the first workflow;
  based on the workflow type data, generating cookie data representative of a cookie that indicates the first workflow has been assigned to perform the first operation on the file, wherein the cookie data comprises type data that, based on a type of the cookie, defines interactions between the file and a group of workflows, and wherein the group of workflows comprises at least the first workflow;
  populating a cookie data structure, associated with the file, with the cookie data;
  setting the type data to a static type that indicates a second workflow of the group of workflows, configured to perform a second operation on the file, is permitted to execute while the first workflow has ownership of the cookie; and
  updating the cookie data to indicate the first workflow and the second workflow have co-ownership of the cookie.

2. The device of claim 1, wherein the operations further comprise setting the type data to a disposable type that indicates the first workflow has ownership of the cookie until the first workflow ceases executing, independent of whether the first workflow has resulted in a completion of the first operation.

3. The device of claim 1, wherein the operations further comprise setting the type data to a reclaimable type that indicates the first workflow has ownership of the cookie until the first workflow results in completion of the first operation, independent of whether the first workflow ceases executing prior to the completion of the first operation.

4. The device of claim 1, wherein the operations further comprise setting the type data to a dynamic type that indicates a second workflow, of the group of workflows, executed by a third processor and configured to perform a second operation on the file, is not permitted to execute while the first workflow has ownership of the cookie.

5. The device of claim 1, wherein the cookie data comprises a persistence indicator that indicates whether a condition by which the first workflow maintains ownership of the cookie is satisfied, and wherein the ownership of the cookie is with respect to a second workflow, of the group of workflows, executed by a third processor and that is configured to perform a second operation on the file.

6. The device of claim 5, wherein the operations further comprise:
  setting the persistence indicator to a first state that indicates the first workflow has ownership of the cookie in response to determining that the condition is satisfied.

7. The device of claim 5, wherein the operations further comprise setting the persistence indicator to a second state that indicates the first workflow no longer has ownership of the cookie in response to determining that the condition is not satisfied, and that second workflow has ownership of the cookie.

8. The device of claim 5, wherein the operations further comprise setting the persistence indicator to a third state that indicates the cookie is not owned in response to determining that the condition is not satisfied.

9. The device of claim 1, wherein the cookie data comprises a sharing indicator that indicates whether a second workflow, of the group of workflows, executed by a third processor and that is configured to perform a second operation on the file, is permitted to be initiated while the first workflow has ownership of the cookie.

10. The device of claim 1, wherein the file is a stub file that references a cloud file or other data stored at a cloud platform storage device.

11. The device of claim 10, wherein the stub file comprises the cookie data structure.

12. A computer-readable storage medium comprising instructions that, in response to execution, cause a device comprising a first processor to perform operations, comprising:
  determining that a first workflow has been initiated, wherein the first workflow is executed by a second processor and is configured to perform a first operation on a file that comprises a cookie data structure;
  determining, based on a characteristic of the first workflow, workflow type data indicative of a workflow type of the first workflow;
  generating, based on the workflow type data, cookie data indicative of a cookie that indicates the first workflow has control over the file;
  generating, based on a type of the cookie, type data that defines interactions between the file and a group of workflows comprising at least the first workflow and populating the cookie data structures, associated with the file, with the cookie data;
  setting the type data to a static type that indicates a second workflow of the group of workflows, configured to perform a second operation on the file, is permitted to execute while the first workflow has ownership of the cookie; and
  updating the cookie data to indicate the first workflow and the second workflow have co-ownership of the cookie.

13. The computer-readable storage medium of claim 12, wherein the operations further comprise setting the type data to a disposable type that indicates the first workflow has control over the file until the first workflow ceases executing, regardless of whether the first workflow has resulted in a completion of the first operation.

14. The computer-readable storage medium of claim 12, wherein the operations further comprise setting the type data to a reclaimable type that indicates the first workflow has control over the file until the first workflow results in completion of the first operation, independent of whether the first workflow ceases executing prior to the completion of the first operation.

15. The computer-readable storage medium of claim 12, wherein the operations further comprise setting the type data to a static type that indicates a second workflow, of the group of workflows, that is executed by a third processor and is configured to perform a second operation on the file, is permitted to execute while the first workflow has control over the file.

16. The computer-readable storage medium of claim 12, wherein the operations further comprise setting the type data to a dynamic type that indicates a second workflow, of the group of workflows, that is executed by a third processor and is configured to perform a second operation on the file, is not permitted to execute while the first workflow has control over the file.

17. A method, comprising:
   determining, by a device comprising a first processor, that a workflow, executed by a second processor and configured to perform an operation on a file, has been instantiated;
   based on a characteristic of the workflow, determining, by the device, workflow type data representative of a workflow type of the workflow;
   based on the workflow type data, constructing, by the device, cookie data representative of a cookie that indicates the workflow has been assigned to perform the operation on the file;
   constructing, by the device, type data based on a type of the cookie, wherein the type data defines interactions between the file and a group of workflows comprising at least the workflow;
   setting the type data to a static type that indicates a second workflow of the group of workflows, configured to perform a second operation on the file, is permitted to execute while the first workflow has ownership of the cookie;
   populating, by the device, a cookie data structure of the file with the cookie data; and
   updating the cookie data to indicate the first workflow and the second workflow have co-ownership of the cookie.

18. The method of claim 17, wherein the workflow is a first workflow and the operation is a first operation, and further comprising, determining, by the device, whether a condition, by which the first workflow maintains ownership of the cookie with respect to a second workflow, of the group of workflows, that is executed by a third processor and is configured to perform a second operation on the file, is satisfied.

19. The method of claim 18, further comprising setting, by the device, a persistence indicator to a first state that indicates the first workflow has ownership of the cookie in response to determining that the condition is satisfied.

20. The method of claim 18, further comprising, setting, by the device, a persistence indicator to a second state that indicates the cookie is not owned in response to determining that the condition is not satisfied.

* * * * *